Feb. 6, 1968 B. W. OLSON 3,367,600
SPOOL MOUNTING DEVICE
Filed Oct. 6, 1966 2 Sheets-Sheet 1
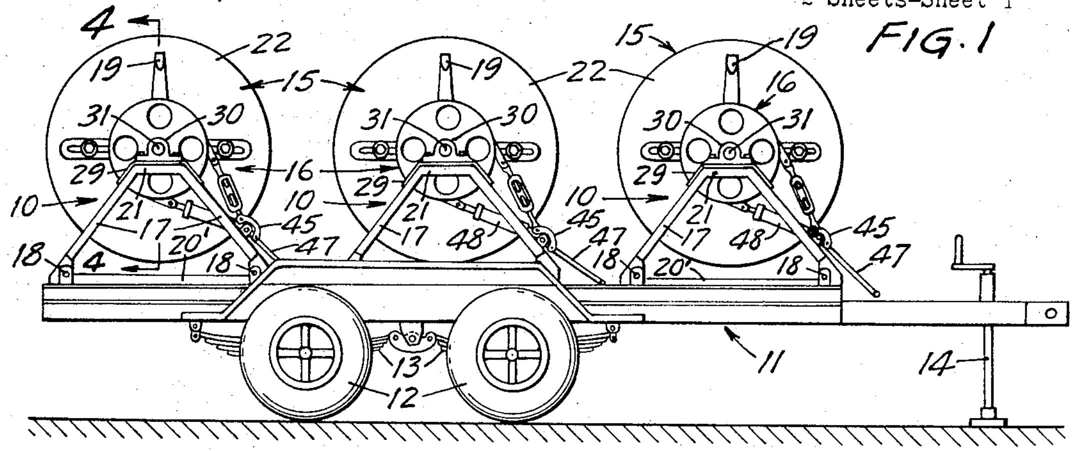
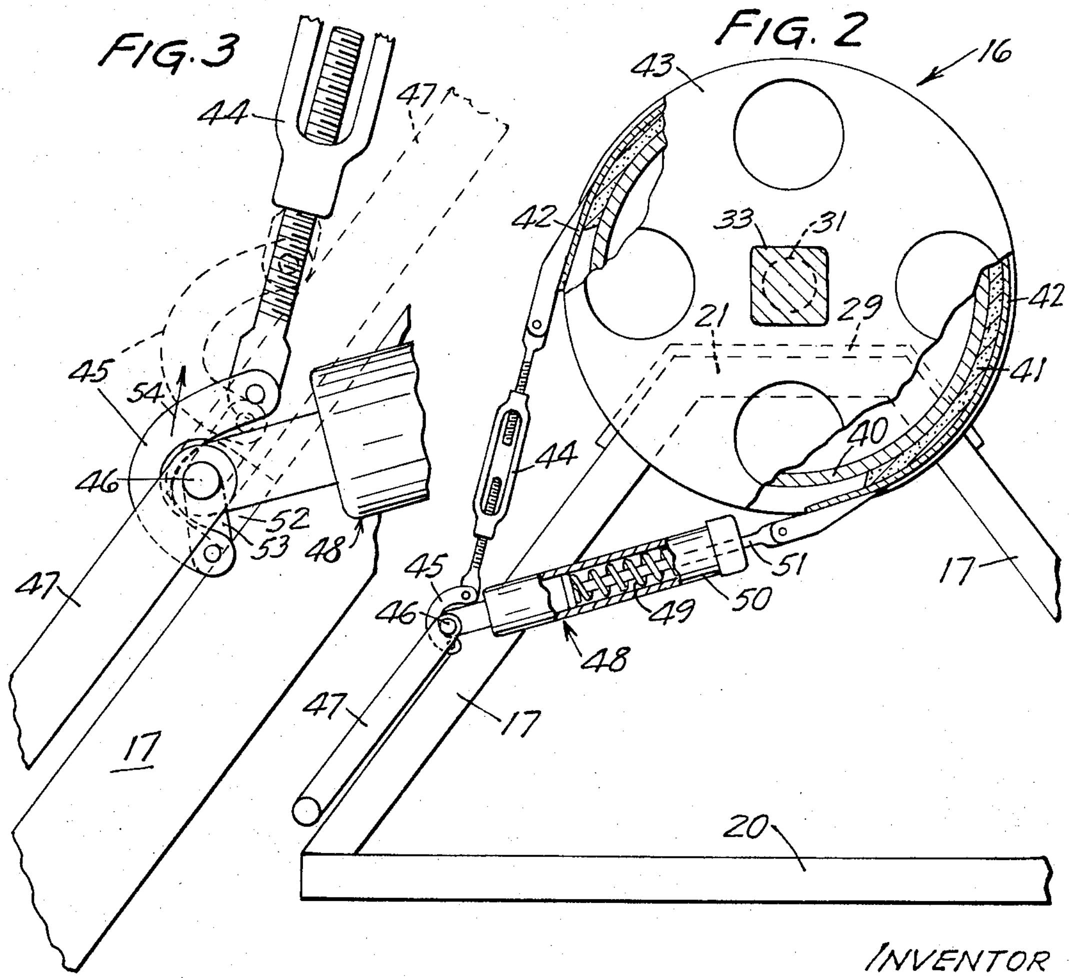
INVENTOR
BUFORD W. OLSON
BY Williamson, Palmatier & Bains
ATTORNEYS Feb. 6, 1968 B. W. OLSON 3,367,600

SPOOL MOUNTING DEVICE

Filed Oct. 6, 1966 2 Sheets-Sheet 2

INVENTOR
BUFORD W. OLSON
BY
Williamson, Palmatier & Bains
ATTORNEYS

United States Patent Office 3,367,600

Patented Feb. 6, 1968

3,367,600

SPOOL MOUNTING DEVICE

Buford W. Olson, Hopkins, Minn., assignor to Chas. Olson & Sons Inc., Minneapolis, Minn., a corporation of Minnesota Filed Oct. 6, 1966, Ser. No. 584,750
4 Claims. (Cl. 242—86.7)

ABSTRACT OF THE DISCLOSURE

A trailer is provided with oppositely disposed frame members having bearings mounted thereon for rotatively supporting the opposite ends of a shaft extending axially through a wire or cable carrying spool. A stub shaft carrying a brake drum and cooperating, adjustable brake band is mounted on one of the frame members. The inner end of the stub shaft is provided with a socket having a transverse opening in one side thereof into which one of the outer ends of the spool shaft may be conveniently moved into place in a downward, vertical direction. A collar or sleeve slidably positioned on the end of the spool shaft is utilized to firmly couple the spool shaft end in place in the socket of the stub shaft.

This invention relates to a spool mounting device and, more particularly, relates to a spool mounting device adapted to detachably receive a cable spool for transporting the spool and for unreeling the cable from the spool.

Cable is typically transported on a spool or reel which must be mounted on a wheel mounted trailer for ease in transporting the cable spools from one location to another. The cable spool, in turn, is typically mounted on a frame for efficient dispensing of the cable, typically under tension. The frame which receives the cable spool may utilize any of several available means to prevent "free wheeling" of the cable spool as the cable is being unreeled. Several frames may be mounted on a single trailer for transportation of the cable spools. It is particularly important, when several cable spools are mounted on a single trailer, that a subsequent spool can be unreeled without the need for cumbersome replacement of the spent spool with a subsequent full spool. It is also important that the spool receiving frame is adapted to quickly and efficiently interchange cable spools.

With these comments in mind it is to the elimination of these and other disadvantages to which the present invention is directed along with the inclusion therein of other novel and desirable features.

An object of my invention is to provide a new and improved cable spool mounting device of simple and inexpensive construction and operation.

Another object of my invention is to provide a novel cable spool mounting device which permits quick and efficient interchange of spools.

Still another object of my invention is the provision of an improved novel spool mounting device which properly tensions the cable as it is unreeled thereby controlling the "free wheeling" effect of the spool which is rotatably mounted on the frame.

A further object of my invention is the provision of a spool mounting device, several of which may be affixed to a trailer for transportation from one job site to another and for dispensing cable without the need for any interchange of these spools mounted on the trailer.

A still further object of my invention is the provision of an improved cable mounting device which dispenses cable from the spool under tension and which permits quick and easy interchange of the spools in the frame as well as simplicity in operation thereby permitting a person of minimum skill or manual dexterity to assemble and operate my device.

These and other objects and advantages of my invention will more fully appear from the following description made in connection with the accompanying drawings wherein like reference characters refer to the same or similar parts throughout the several views, and in which:

FIG. 1 is a side elevation view showing my spool mounting devices attached to a wheel mounted trailer.

FIG. 2 is an enlarged fragmentary end view showing how the spool braking device is attached to the spool mounting frame, with portions broken away for clarity.

FIG. 3 is an enlarged partial view showing the brake actuating lever, engaged in the solid lines and disengaged in the dotted lines.

FIG. 4 is an enlarged sectional view taken along the lines 4—4 of FIG. 1.

Figures 5, 6:
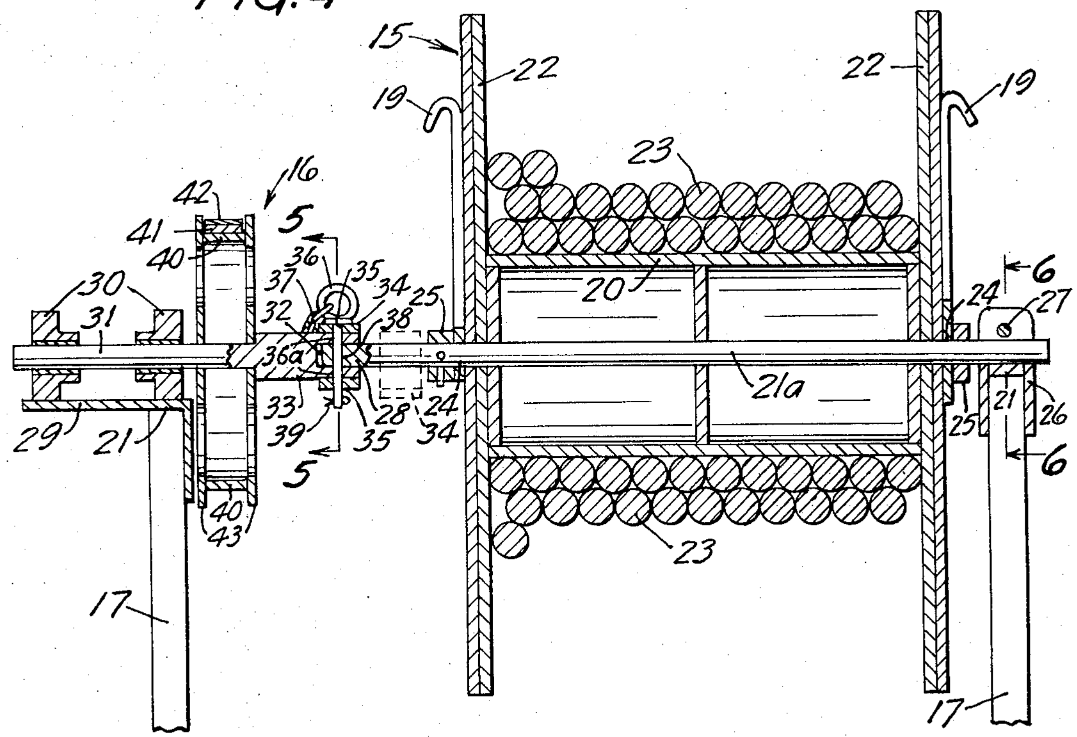
FIG. 5 is an enlarged sectional view taken along the lines 5—5 of FIG. 4.
FIG. 6 is an enlarged sectional view taken along the lines 6—6 of FIG. 4.

One form of the present invention is shown in the drawings and is described herein. Referring to FIG. 1, my spool mounting device, denoted generally by numeral 10, is shown on a wheel mounted trailer 11 which has wheels 12 mounted on trailer 11 by spring suspension 13. Trailer 11 also includes an adjusting or leveling mechanism 14. The spool mounting device 10 is shown with reels or cable spools 15 mounted thereon. A brake assembly is indicated at 16 attached to each separate spool mounting frame 17. The spool mounting frame 17 is detachably mounted on the trailer 11 as by bolting the unit together at suitable detachable joints 18. The entire spool and frame assembly, including the brake assembly, may be lifted by utilizing lifting hooks 19 which are attached to the cable spool or reel. Hooks 19 are typically used when interchanging reels on the mounting frame.

Frame 17 includes suitable longitudinal bracing members 20' as well as transverse bracing members which are not shown in FIG. 1. Frame 17 is somewhat triangular in shape with a level, bearing receiving portion 21 disposed to receive and support cable spool or reel 15 for rotatable movement therein.

Referring to FIG. 4, frame 17 is shown with reel 15 rotatably mounted thereon. Cable spool or reel 15 includes a cylindrically shaped drum member 20 affixed to a spool mounting shaft **21*a*. Side flanges 22 are disposed at each end of drum 20 and provide means for retaining and aligning a cable 23, which is wound on drum 20. Lifting hooks 19 are located on each side of the flange elements 22 and are secured on shaft 21*a* at the point indicated by the numeral 24. A collar 25 positions the spool and lifting hooks on the shaft 21*a***.

One side of frame 17 includes a cradle member 26 attached thereto at the level portion 21 of the frame 17. Cradle or saddle member 26 is adapted to receive shaft **21*a* for rotation therein. A pin 27 is inserted in the cradle element to secure shaft 21*a*** therein.

On the other side of cable spool 15, the shaft **21*a* extends outwardly from flange 22 and includes a squared end 28**.

The corresponding side of frame 17 includes a supporting plate 29 secured to the level portion of frame 17, as denoted at 21. A pair of pillow block bearings 30 are attached to plate 29 and are adapted to receive spool receiving shaft 31. Brake assembly 16 is attached to spool receiving shaft 31 and imparts a braking action thereto as desired. Spool receiving shaft 31 includes spool mounting shaft receiving cradle or socket 32 which receives and mates with squared end portion 28 of spool mounting shaft **21*a*. Cradle portion 32** is formed from a widened portion 33 of shaft 31 and includes three sides, with one side open adapted to receive shaft portion 28 into the cradle portion 32 forming coupling means for the shafts 21*a* and 31. A rectangular sleeve 34 surrounds the widened portion 33 and covers the opening in the three sided cradle 32 when in position. In the secure position, as shown in the solid lines, rectangular retaining portion 34 includes an aperture 35 adapted to receive a pin 36 which is attached to widened portion 33 by a chain 37. Pin 36 projects through the aperture 35 in the rectangular retaining portion 34 and into a corresponding aperture in the cradle side members, through an aperture 38 in shaft 28 and again through the side wall of cradle 32 and the corresponding aperture 35 on the other side of the rectangular retaining element 34. A cotter pin 39 retains pin 36 in the secure position. As shown in the dotted lines, the retaining sleeve 34 has been pushed back along shaft 21*a* towards the spool 15, thereby releasing the sleeve from the widened shaft portion 33 to permit removal of the squared end portion 28 of shaft 21*a* from the cradle 32 of shaft 31.

Frame 17 is typically constructed from rigid steel stock, typically square tubing. Of course, angle stock may be used as well. The supporting longitudinal and transverse members are also constructed of tubular stock and the bearing supporting plate is constructed from plate steel stock and cut to fit as desired. The bearings are commercially available pillow blocks and may be ball bearing, roller bearing or as desired. The shaft material is typically cold rolled steel shafting of approximately 1 inch in diameter. The drum is metallic and has, typically, wooden side flanges. The hooks which are attached to the spool mounting shaft are of a steel construction, bent to conform to a hook shape.

The brake assembly 16 is shown in detail in FIG. 2. The brake is shown mounted on frame 17 at plate 29 which is attached to level portion 21 of the frame 17. Shaft 31 is shown projecting through the brake 16 with the widened portion 33 also shown. The brake includes a brake drum 40 and a mating brake shoe 41 which is riveted to brake band 42. Side flanges 43 are attached to the drum 40 and maintain the brake band and shoe in line. A brake actuating mechanism is attached to brake band 42 and includes an adjustable connecting arm 44 which joins the brake band 42 with link 45 which, in turn, is connected to a floating link, not shown in FIG. 2. The floating link is pivotally attached to shaft 46 to which is attached lever arm 47 for manually controlling the braking action of brake 16. Shock absorbing means 48 is attached to shaft 46 and to brake band 42 to provide means effecting controlled slippage of the brake shoe on the brake drum. Shock absorber 48 is commercially available and comprises a tension spring 49 within a housing 50 to which is attached connecting rod 51 which joins the brake band 42 with the shock absorber 48 which in turn is connected to shaft 46.

A detail of the brake actuating lever and linkage assembly is shown in FIG. 3. The assembly is shown in solid lines, in which position the brake band and shoe are in position contacting the drum. In the dotted lines, the drum revolves freely. Shaft 46 is stationary and is mounted on framework 17 at bracket 52. Link 53 is securely attached to shaft 46 and rotates under power of lever 47. The floating, semi-circular link 45 is pivotally connected to link 53 and to connecting arm 44. As the handle 47 is rotated from the solid line position to the dotted line position, link 53 is forced to the position as shown in the dotted lines thereby causing floating link 45 to move in the direction indicated by arrow 54. In this position, as indicated by the dotted lines, the connecting rod 44 is moved toward the drum of the brake assembly thereby loosening the shoe which rides on the drum.

Referring to FIG. 5, a detail of the spool mounting shaft cradle and coupling assembly is shown. Squared portion 28 of shaft 21*a* is shown in three sided cradle 32 of the widened portion 33 of shaft 31. Sleeve or retaining member 34 is shown in place and receives, through aperture 35, the pin 36. Pin 36 then proceeds through apertures 36*a* in cradle member 32 which apertures correspond with aperture 35. Aperture 38 in squared shaft portion 28 receives pin 36 and cotter pin 39 completes the assembly thereby securing the shaft 21*a* in the cradle shaft receiving portion of shaft 31.

Referring to FIG. 6, shaft 21*a* is shown in cradle element or portion 26 which is attached to frame 17 at the level portion 21 thereof through bracket 55. Hook 19 is shown and is attached to shaft 21*a* at aperture 24. Pin 27 is shown secured in cradle portion 26 through the apertures 56 and retained in the cradle 26 by cotter pin 57. A chain 58 secures pin 27 to level portion 21 of frame 17.

In operation, pins 27 and 36 are removed thereby opening cradle portions 26 and 32 respectively. The open portions of the shaft receiving cradles are positioned with the opening disposed upwardly to receive the spool mounting shaft 21*a*. The spool is lifted at hooks 19 and lowered into the respective cradles with the shaft 21*a* being positioned in cradle 26 and secured in the cradle by pin 27 and cotter key 57 which securely hold the shaft 21*a* within the cradle 26 which is securely attached to frame 17. Squared portion 28 of shaft 21*a* is positioned in cradle 32 and rotates with shaft 31 which is co-extensive with the cradle. Pin 36 is inserted and locked in place with cotter pin 39 thereby preventing shaft 21*a* from escaping from the cradle 32 when in use. The cable spool or reel is then securely locked in position for rotation about shaft 21*a*. Shaft 31 rotates in bearings 30 in line with shaft 21*a*. Brake 16, which is mounted on shaft 31, is adjusted by the operator to suit operating conditions. To properly lock shaft 21*a* in the cradle 32 of shaft 31, sleeve 34 is positioned over the open portion of the cradle 32 with the pin 36 projecting through the sleeve portion 34 and securely maintaining it in place thereby additionally securing the shaft 21*a* and the cradle 32.

When the cable spool is spent, subsequent spools may be drawn from without removing the first spent spool. When it becomes necessary to remove a spool for replacement by a full spool, pins 27 and 36 are simply removed, sleeve 34 is slidably removed from portion 33 of shaft 31 and the openings of cradles 26 and 32 are opened upwardly thereby allowing the operator to lift the empty spool and spool mounting shaft 21*a* away from the spool mounting device.

From the foregoing it will be seen that I have provided a new and novel spool mounting device which not only properly tensions the cable as it is dispensed from the spool, but also provides positive, quick and efficient means for engaging or disengaging the spool from the spool mounting device. Further, I have provided a spool mounting device which may be attached singly to a wheel mounted trailer, or which may be attached in groups to a wheel mounted trailer in such a way that is not necessary to remove spent spools prior to utilizing a subsequent supply spool. I have also supplied means for controlling the tension on the cable as it is dispensed, thereby greatly varying the cable types which my spool mounting device will accommodate. Not only will my device efficiently dispense copper wire of the smallest diameter, but it will also dispense heavy steel cable material approximately 1 inch in diameter.

It will, of course, be understood that various changes may be made in the form, details, arrangement and proportions of the various parts without departing from the scope of my invention.

What is claimed is:

1. A cable spool mounting device adapted to mount a cable spool having a cable receiving drum with flanges attached thereto, said cable spool mounting device comprising,

- a frame having a pair of opposed upright frame members,
- a spool mounting shaft disposed axially of said cable spool drum and projecting outwardly of said flanges, said spool mounting shaft being rotatably mounted, on one end thereof, on one of said upright frame members for rotation about a substantially horizontal axis and having, at the other end thereof, a non-circular periphery,
- a spool receiving shaft mounted on the other one of said upright frame members for rotational movement thereon about a substantially horizontal axis in line and substantially coextensive with said spool mounting shaft, said spool receiving shaft having, at one end thereof, a socket with a transversely extending opening therein, said socket having a non-circular shape corresponding to the non-circular periphery of said spool mounting shaft and receiving said spool mounting shaft therein whereby said spool mounting shaft and said spool receiving shaft rotate together,
- means retaining said spool mounting shaft in said socket of said spool receiving shaft, and
- a brake mechanism affixed on one of the upright frame members of said frame, said brake mechanism being operably connected to said spool receiving shaft to permit braking of the rotation of said spool receiving shaft whereby rotational motion of the cable spool mounted on said spool mounting shaft may be controlled.

2. The cable spool mounting device of claim 1 wherein said means retaining said spool mounting shaft in said socket comprises, a sleeve member slidably mounted on said spool mounting shaft and adapted to enclose said transversely opening socket of said spool receiving shaft whereby said spool mounting shaft is secured in said socket of said spool receiving shaft and including locking means to permit locking said sleeve member on said spool receiving shaft.

3. The cable spool mounting device of claim 2 wherein said brake mechanism is mounted on said other one of said upright frame members, and comprises a drum affixed to said spool receiving shaft, a brake band and shoe co-operable with said brake drum and affixed at one end of said brake band to tension means and at the other end to an adjustable link member, an actuating lever attached to said adjustable link member to permit engagement of said brake band and shoe with said brake drum whereby rotation of said cable spool may be controlled.

4. The cable spool mounting device of claim 1 wherein said socket is three-sided and has one open side which provides said transversely extending opening, and said one end of said spool mounting shaft rotates in upwardly opening cradle means affixed to said one of said upright frame members, said cradle means comprising a bearing surface adapted to receive for rotatable movement therein said spool mounting shaft, whereby said cable spool may be easily mounted on said frame by turning said spool receiving shaft so that said open side of said socket faces upwardly and lowering said drum vertically downwardly to a position where said spool mounting shaft ends come to rest in said socket and said cradle means.

References Cited

UNITED STATES PATENTS

| | | | |
|---|---|---|---|
| 327,196 | 9/1885 | Roberts | 242—86.7 |
| 2,635,827 | 4/1953 | Stemm et al. | 242—86.7 |
| 3,203,640 | 8/1965 | Garnett | 242—86.7 |

FRANK J. COHEN, *Primary Examiner.*

N. MINTZ, *Assistant Examiner.*